United States Patent [19]
Oku et al.

[11] Patent Number: 5,523,669
[45] Date of Patent: Jun. 4, 1996

[54] CHARGING CIRCUIT CAPABLE OF SUPPLYING DC VOLTAGE DIRECTLY TO POWER SUPPLY CIRCUIT WHEN BATTERY IS REMOVED

[75] Inventors: Setsuya Oku; Yasuhiro Shirakawa, both of Shiga, Japan

[73] Assignee: NEC Corporation, Tokyo, Japan

[21] Appl. No.: 96,403

[22] Filed: Jul. 26, 1993

[30] Foreign Application Priority Data

Jul. 24, 1992 [JP] Japan ................................. 4-218639

[51] Int. Cl.$^6$ ....................................... H02J 7/00
[52] U.S. Cl. ................... 320/14; 320/22; 320/51
[58] Field of Search ..................... 320/2, 3, 4, 14, 320/20, 21, 27; 307/66

[56] References Cited

U.S. PATENT DOCUMENTS

| | | | |
|---|---|---|---|
| 4,006,396 | 2/1977 | Bogut | 320/2 |
| 4,636,741 | 1/1987 | Mitzlaff | 330/127 |
| 4,672,293 | 6/1987 | Crampton | 320/14 |
| 5,184,059 | 2/1993 | Patino et al. | 320/15 |
| 5,355,073 | 10/1994 | Nguyen | 320/15 |

FOREIGN PATENT DOCUMENTS

| | | |
|---|---|---|
| A2846799 | 5/1979 | Germany . |
| A3415573 | 11/1984 | Germany . |

*Primary Examiner*—Steven L. Stephan
*Assistant Examiner*—Nicholas Ponomarenko
*Attorney, Agent, or Firm*—Sughrue, Mion, Zinn, Macpeak & Seas

[57] ABSTRACT

A parallel circuit of a charging resistor and a discharging diode D2 is connected in series only to a battery. An external DC power supply voltage can be supplied from external DC power supply terminals directly to a power supply circuit without going through a charging resistor for the battery.

1 Claim, 5 Drawing Sheets

CHARGING CIRCUIT CAPABLE OF SUPPLYING DC VOLTAGE DIRECTLY TO POWER SUPPLY CIRCUIT WHEN BATTERY IS REMOVED

BACKGROUND OF THE INVENTION

1. Field of the Invention

The present invention relates to a charging circuit for charging a secondary cell housed in an instrument such as a cordless hand set (slave hand set) of a cordless-phone (cordless telephone system).

2. Description of Related Art

In the cordless-phone, the cordless hand set (called a "child machine" hereinafter) comprises a secondary cell type battery, and operates with receiving an electified power from the battery when it is in use. This child machine is set on a charging stand when it is in a stand-by condition, so that the battery is charged by an external DC power supplied from this charging stand.

First of all, a conventional basic charging circuit widely used for the cordless hand set of the cordless-phone comprises a pair of external DC power supply terminals to be connected to the circuit of a charging stand of the child machine when it is set on the charging stand. These external DC power supply terminals are connected to the battery housed in the child machine through a diode and a charging resistor. Thus, if the child machine is set on the charging stand, the battery is charged by the external DC power, supplied through these external DC power supply terminals. The charging resistor is provided to limit the charging current of this battery, thereby facilitating regular charging in the charging circuit.

A main power supply switch and a power supply circuit are connected to the battery in parallel with the external DC power supply terminals, the diode and the charging resistor. The power supply circuit is intended to supply, on the basis of a voltage supplied from the battery, a $V_{DD}$ voltage to a control circuit for controlling the operation of the child machine. The main power supply switch is provided as a switch for operating a turn-on and a turn-off of the power supply circuit. Thus, this charging circuit can charge the battery from the external DC power supply terminals even in the condition that the main power supply switch is turned off to stop the operation of the child machine.

A conventional charging circuit which performs a rapid charging function comprises a rapid charging switching circuit instead of the diode and the charging resistor in the above mentioned basic charging circuit. The rapid charging switching circuit is formed by connecting a series circuit of a diode and a charging resistor and another series circuit of a PNP transistor and another charging resistor in parallel to each other. The first named charging resistor is the same as that of the above mentioned basic charging resistor and effects the usual charging. The second named charging resistor is a resistor for a rapid charging, having a resistance smaller than that of the first named charging resistor. Further, the turn-on and turn-off of the transistor is controlled by a rapid charging signal supplied from a control circuit, which monitors the voltage of the battery by a detecting circuit. When the voltage is low, the control circuit generates the rapid charging signal which turns the transistor on.

Thus, when the child machine is set on the charging stand, this charging circuit supplies a charging current from the external DC power supply terminals through the second named charging resistor having the small resistance value to the battery in the case that the transistor of the rapid charging switching circuit is conductive, so that the charging current becomes a large current and can effect the rapid charging. Then, if the transistor of the rapid charging switching circuit is turned off, the charging current from the external DC power supply terminals 1 and 1' is supplied to the battery through the first named usual charging resistor and the usual charging is effected.

However, in the charging circuit as mentioned above, for example when the battery is removed, even if the external DC power supply voltage is supplied from the external DC power supply terminals, the external DC power supply voltage is supplied to the power supply circuit through the first named charging resistor or the second named charging resistor of the rapid charging switching circuit. Therefore, the conventional charging circuit could not supply, directly form the external DC power supply terminals, a sufficient driving current for operation of the control circuit 4.

SUMMARY OF THE INVENTION

Accordingly, it is an object of the present invention to provide a charging circuit which has overcome the above mentioned defect of the conventional charging circuit.

Another object of the present invention is to provide a charging circuit capable of supplying a DC voltage directly to the power supply circuit when the battery is removed.

The above and other objects of the present invention are achieved in accordance with the present invention by a charging circuit having a power supply circuit of an electrical instrument and a secondary cell type battery which are connected in parallel to external DC power supply terminals, characterized in that a parallel circuit of a resistor for limiting a charging current and a diode for discharging is connected in series to the battery.

With the above mentioned structure, if the external DC power supply is not connected, a discharging current flows from the secondary cell type battery through the power supply circuit of the electrical instrument and the discharging diode, so that the power supply is supplied from the secondary cell type battery to the electrical instrument.

Further, if the external DC power supply is connected, the charging current flows from the external DC power supply through the secondary cell type battery and the charging resistor. The charging current is limited by the charging resistor so that the secondary cell type battery is charged. Furthermore, in this case, the electric power can be supplied from the external DC power supply to the power supply circuit of the electrical instrument without going through the charging resistor of the electrical instrument even if the secondary cell type battery is removed.

As the result, in the charging circuit in accordance with the present invention, a sufficient amount of electrical current can be supplied directly from the external DC power supply to the power supply circuit of the electrical instrument even if the secondary cell type battery has a low voltage or is removed.

In addition, if a main power supply switch of the electrical instrument is provided only in the power supply circuit, it is possible to charge the secondary cell type battery from the external DC power supply when the main power supply switch is off. Further, for example, in the case that there is a risk that the external DC power supply is short-circuited, or if it is necessary to detect that the external DC power supply is connected, a reverse current preventing diode can be connected in series to the external DC power supply in order to prevent the reverse current from flowing from the secondary cell type battery. Furthermore, if the charging resistor has a small resistance value for the rapid charging, and if a rapid charging switching circuit for switching between a circuit for allowing a current to flow through a new resistor having a resistance value for the usual charging, and a circuit for by-passing the new resistor is associated with the charging resistor and connected in series to the external DC power supply, it is also possible to effect the rapid charging.

The above and other objects, features and advantages of the present invention will be apparent from the following description of preferred embodiments of the invention with reference to the accompanying drawings.

DESCRIPTION OF THE PREFERRED EMBODIMENTS

Figure 1:
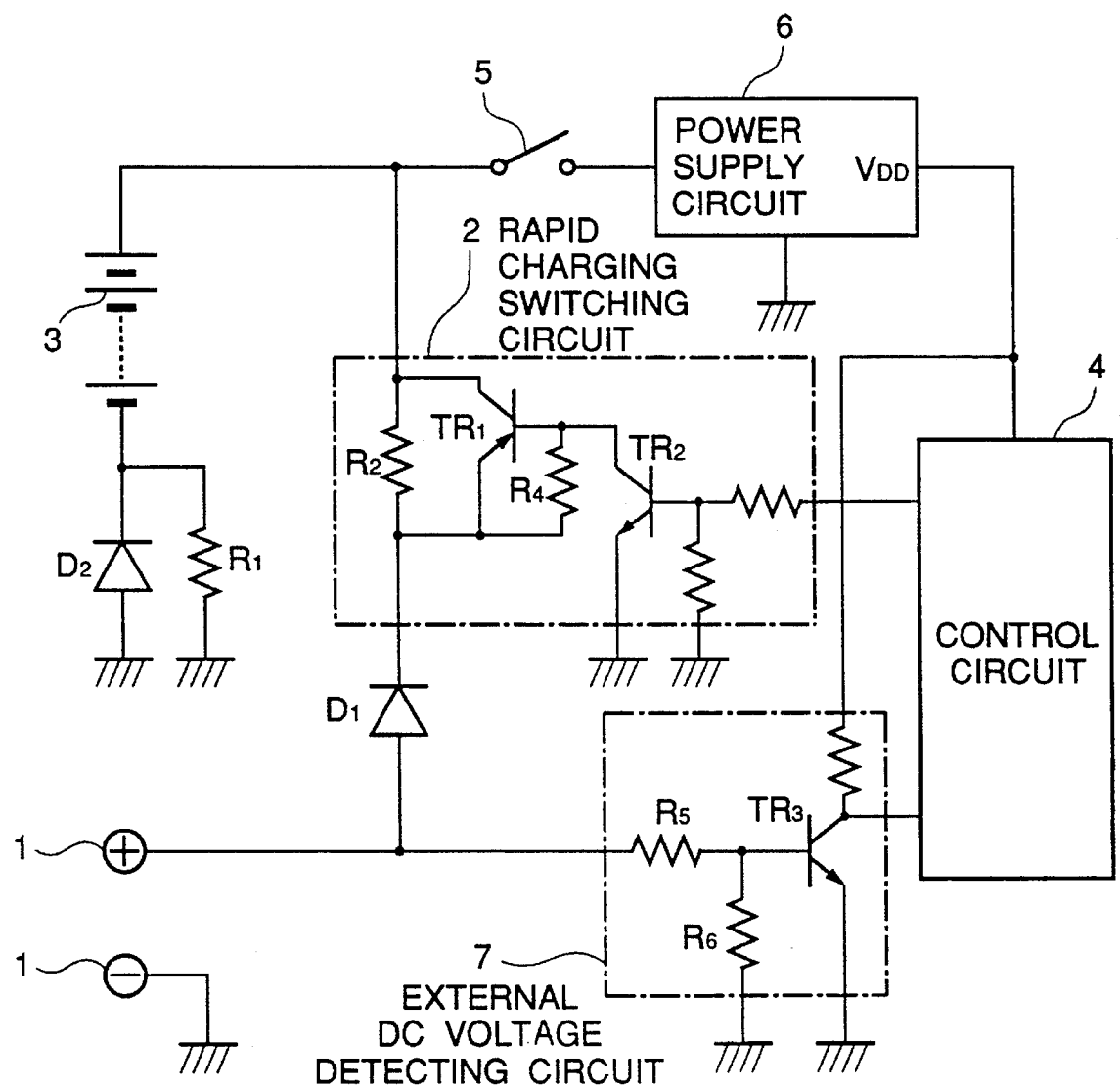
FIG. 1 is a block diagram of the charging circuit showing one embodiment of the present invention.

The present invention will be described in more detail in the following examples with reference to the accompanying drawings.

The present embodiment will be described in connection with a charging circuit set on a child machine of a cordless telephone.

The child machine of the cordless telephone is put on a charging stand in the standby mode. This charging stand is a support that converts an AC power supply of 100 V into a DC power supply of a predetermined voltage. A charging circuit of the child machine is configured to receive an electric power from the external DC power supply through a pair of external DC power terminals 1 and 1' shown in FIG. 1.

The external DC power supply terminal 1 at the side of a positive pole is connected through a diode D1 and a rapid charging switching circuit 2 to a positive electrode of a battery 3. The battery 3 is a secondary cell type battery composed of a nickel-cadmium storage battery or the like. A negative electrode of the battery 3 is grounded in the charging circuit, through a parallel circuit of a first charging resistor R1 and a discharging diode D2. Further, the external DC power supply terminal at the side of a negative pole is directly grounded. In this way, circuit for supplying a charging current to the battery 3 is provided.

A diode D1 is a reverse current preventing rectifier connected in a forward direction to the charging current. The rapid charging switching circuit 2 includes a circuit consisting of a second charging resistor R2 and a PNP transistor TR1 connected in parallel to each other. Further, a resistor R4 is connected between a base and an emitter of the transistor TR1, and a rapid charging signal is supplied to the base of transistor TR1 through an NPN transistor from a control circuit 4. Accordingly, the transistor TR1 is cut off when the rapid charging signal from the control circuit 4 is at a ground level, and on the other hand, if the rapid charging signal is at the $V_{DD}$ power supply level, the base of the transistor TR1 is grounded by the transistor TR2, and therefore, the transistor TR1 is rendered conductive, so that it forms a circuit for by-passing the second charging resistor R2. The control circuit 4 monitors the voltage of the battery 3 by a detecting circuit not shown. If the voltage is low, it is and considered that the charging has not yet been accomplished, and therefore, the control circuit 4 brings the rapid charging circuit at the $V_{DD}$ power supply level. In addition, the transistor TR2 is provided as a buffer to isolate and protect the control circuit 4 from the charging circuit.

The first charging resistor R1 connected to the negative electrode of the battery 3 is set at such a resistance value that it solely functions as a charging resistor in the course of the rapid charging. Further, the second charging resistor R2 in the rapid charging switching circuit is set at such a resistance value that the sum of the resistance of the first charging resistance R1 and the resistance of the second charging resistor R2 becomes a charging resistance in the course of the usual charging. A discharging diode D2 connected in parallel to the first charging resistor R1 is a rectifier connected in a forward direction to a discharge current of the battery 3, and is provided in order to give no limitation of the first charging resistor R1 to tile discharging current of the battery 3. As this discharging diode D2, a diode such as a Schottky barrier diode having a small voltage drop property in the forward direction is preferably used to reduce the loss in the course of the discharging.

A series circuit of a main power supply supply switch 5 and a power supply circuit 6 is also connected to a circuit of the battery 3, the first charging resistor 5 and the discharging diode D2. The main power supply switch 5 is an operation switch for turn on or off the power supply of the child machine of the cordless phone. The power supply circuit 6 is a circuit for generating a $V_{DD}$ power supply voltage based on the electric power supplied from the battery 3, the $V_{DD}$ power supply voltage being supplied to the control circuit 4 mentioned above and an external DC voltage detecting circuit 7 which will be explained, in addition to the system operation current.

To the external DC power supply terminals 1 and 1', the external DC voltage detecting circuit is also connected. The external DC voltage detecting circuit 7 divides the voltage of the external DC voltage detecting voltage detecting signal to the control circuit 4 through an NPN transistor TR3. This external DC voltage detecting signal becomes a level of the $V_{DD}$ power supply when the child machine is removed from the charging stand and therefore the external DC power supply terminals 1 and 1' are open. Thus, for example, the external DC voltage detecting signal can be used to detect whether or not the child machine is on the charging stand. The transistor TR3 is provided as a buffer for isolating and protecting the control circuit 4 from the charging circuit.

Further, the diode D1 is provided to prevent the voltage of the battery 3 from flowing in a reverse direction, which would be erroneously detected by the external DC voltage detecting circuit.

Operation of the charging circuit having the structure mentioned above will be explained.

In the case that the child machine is removed from the charging stand and therefore the external DC power supply terminals 1 and 1' are open, a discharging current from the battery 3 flows through the main power supply switch 5, the power supply circuit 6 and the discharging diode D2. Thus, the power supply circuit 6 can generate the $V_{DD}$ power supply voltage, based on the DC electric power supplied from the battery 3. In this case, further, the external DC voltage detecting signal of the external DC voltage detecting circuit 7 is brought to the level of the $V_{DD}$ power supply as mentioned above, so that the control circuit 4 can detect that the child machine has been removed from the charging stand.

In the case that the child machine is put on the charging stand and that the DC power supply voltage is supplied through the external DC power supply terminals 1 and 1', a charging current from the external DC power supply terminals 1 and 1' flows through the diode D1, the rapid charging switching circuit 2, the battery 3 and the first charging resistor R1. Thus, the battery 3 is charged by the charging current supplied form the external DC power supply terminals 1 and 1'. Then, in the case that the control circuit 4 brings the rapid charging switching signal at the $V_{DD}$ level (active), the transistor TR1 of the rapid charging switching circuit 2 is rendered conductive so as to by-pass the second charging resistor R2. Then, only the first charging resistor R1 becomes the charging resistor, and the charging current increases so that the rapid charging is enabled. Thereafter, when the charging is accomplished and the control circuit 4 brings the rapid charging signal at the ground level (non-active), the transistor TR1 of the rapid charging switching circuit 2 is cut off, and both of the first and second charging resistors R1 and R2 function as the charging resistor so as to reduce the charging current to the regular charging current. Further, in the case that the DC voltage is supplied to the external power supply terminals 1 and 1', the charging of the battery 3 can be effected through the resistor R2 even if the main power supply switch 5 is turned off. Furthermore, at this time, the external DC voltage detecting signal of the external DC voltage detecting circuit 7 is at the ground level, so that the control circuit 4 can detect that the child machine is set on the charging stand.

In the case that the DC power supply voltage is supplied to the external DC power supply terminals 1 and 1', for example, if the voltage of the battery 3 drops abnormally or if the battery 3 is removed, the current from these external DC power supply terminals 1 and 1' is supplied through the diode D1, the rapid charging switching circuit 2 and the main power supply switch 5 to the power supply circuit 6. At this time, it is preferable to control to the effect that the transistor TR1 of the rapid charging switching circuit 2 is rendered conductive. However, since the resistor R2 is set at a small value, the power supply circuit 6 receives a large DC current from the external DC power supply terminals 1 and 1', so that it can generate the $V_{DD}$ power supply voltage on the basis of this DC current.

As the result, according to the charging circuit of the present embodiment, the external DC power supply terminals 1 and 1' can supply a sufficient amount of current to the power supply circuit of the machine directly, even if the voltage of the battery 3 is low or the battery 3 is removed.

Figure 2:
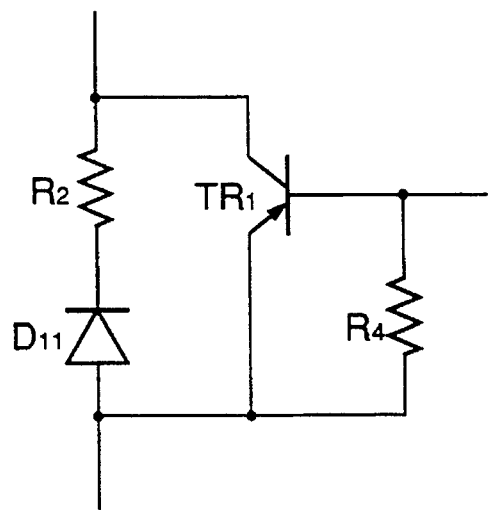
FIG. 2 is a block diagram illustrating the basic structure of the rapid charging switching circuit, showing one embodiment of the present invention.
Figure 3:
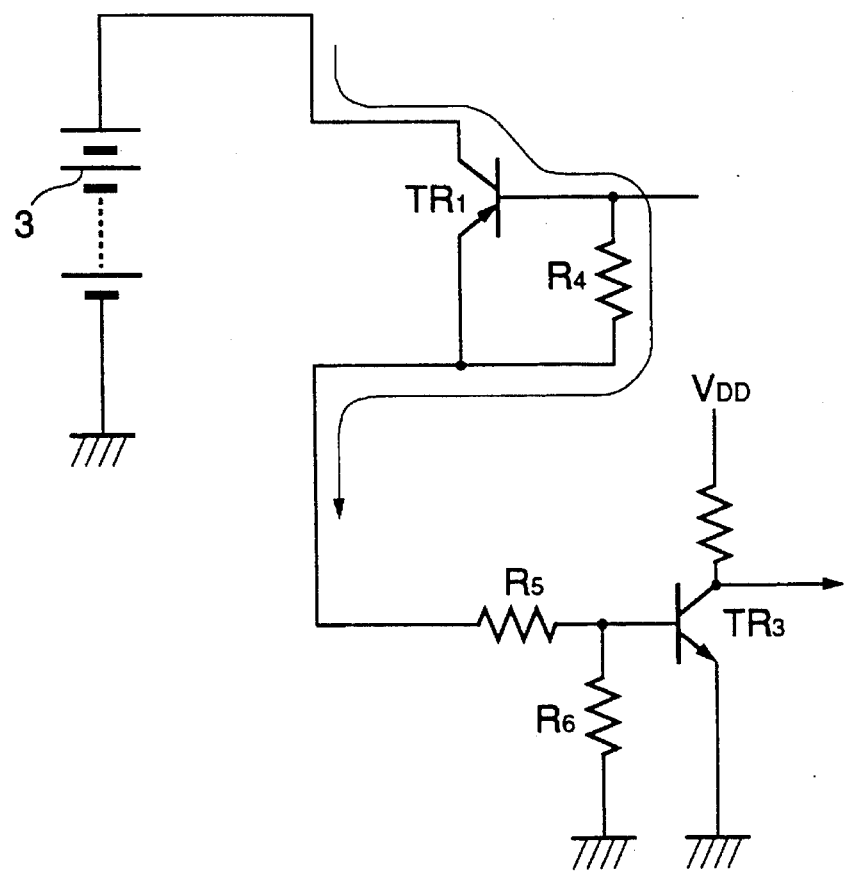
FIG. 3 is a block diagram illustrating a leakage current generated in the rapid charging switching circuit shown in FIG. 2, showing one embodiment of the present invention.
Figure 4:
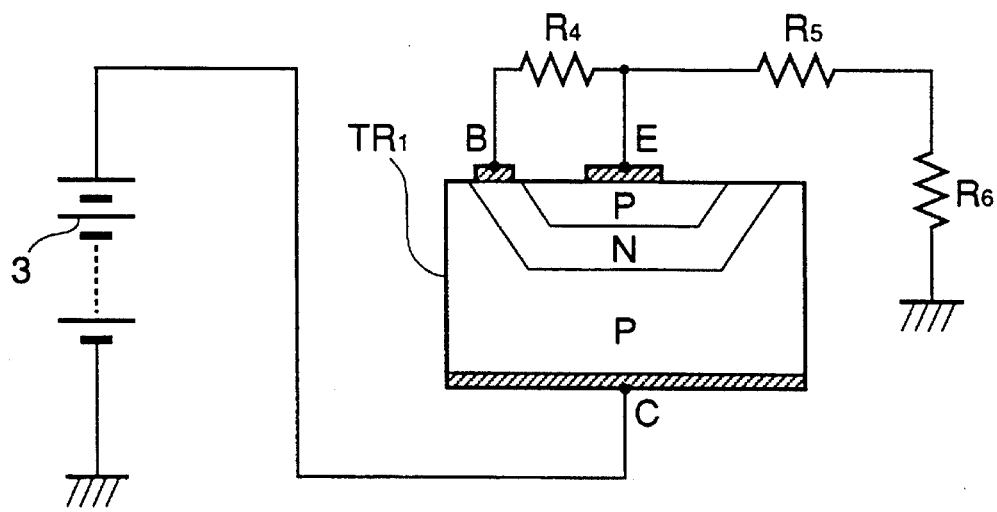
FIG. 4 is a diagram explaining a leakage current generated in the PNP transistor, showing one embodiment of the present invention.

In the embodiment shown in FIG. 1, the diode D1 is connected in series to the rapid charging switching circuit 2. However, this diode D1 is essentially intended to prevent the reverse current from the battery 3. Thus, as shown in FIG. 2, the diode D1 should be able to be substituted by a diode 11 connected in series to the second charging resistor R2 in the rapid charging switching circuit 2. In this modification, however, if the external DC power supply terminals 1 and 1' are open, the transistor TR1 of the rapid charging switching circuit 2 allows a current to flow from the battery 3, as shown in FIG. 3, so that the battery 3 is discharged. In particular, in some condition of forming a planar type PNP transistor, if a reverse bias is applied as shown in FIG. 4, the current from the battery 3 might flow from a collector C through a PN junction between the collector and a base, to a base B of the transistor TR1, and therefore, through the resistor R4 of the rapid charging switching circuit 2 and the resistors R5 and R6 of the external DC voltage detecting circuit 7. Accordingly, if this leak current flows through the transistor TR1 from the battery 3, the external DC voltage detecting circuit 7 causes an error operation and considers that the child machine is set on the charging stand. Namely, the control circuit 4 effects an error detection.

Figure 5:
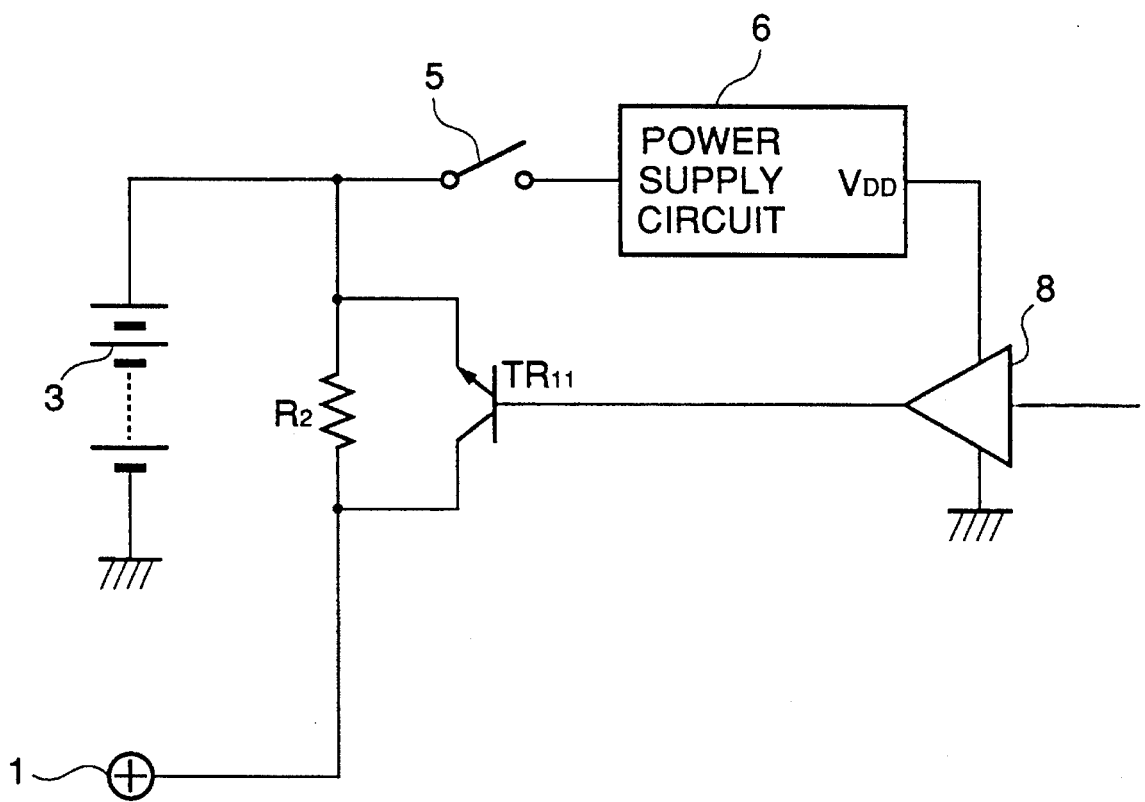
FIG. 5 is a block diagram of the rapid charging switching circuit using an NPN transistor, showing one embodiment of the present invention.
Figure 6:
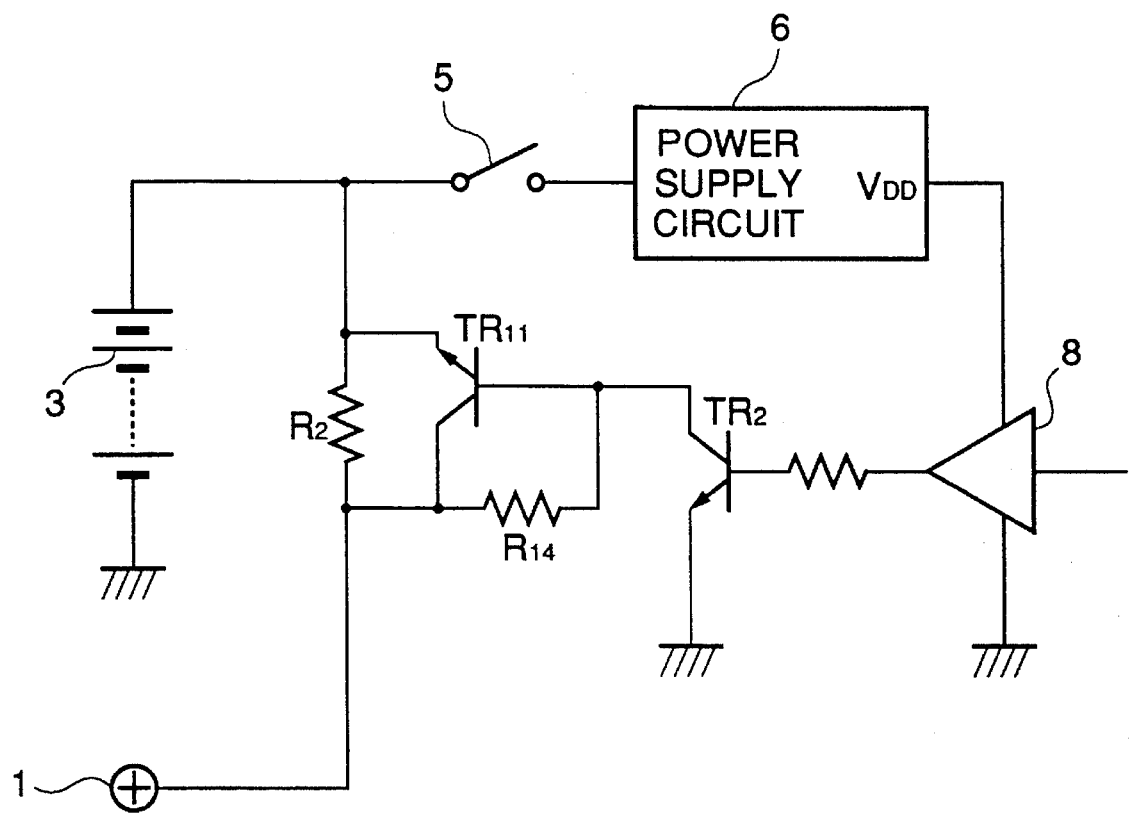
FIG. 6 is a block diagram illustrating another example of a rapid charging switching circuit using an NPN transistor, showing one embodiment of the present invention.

If the transistor TR1 in the rapid charging switching circuit is substituted by an NPN transistor, the leakage current as mentioned above can be prevented. However, only by connecting a NPN transistor TR11 in parallel to the second charging resistor R2 as shown in FIG. 5, the NPN transistor TR11 cannot be driven. Namely, a voltage higher than the output voltage of the emitter must be applied to the base in order to render the transistor TR11 conductive, but it is impossible to generate this voltage in a logic circuit 8 which operates with the $V_{DD}$ power supply voltage supplied from the power supply source in accordance with a conventional method. Further, as shown in FIG. 6, if a resistor R14 is connected between the base and collector of the NPN transistor TR11 and if the circuit is so configured that the same transistor TR2 as that of the present embodiment drives the transistor TR11, the logic circuit 8 outputs the ground level when the main power supply switch is off and therefore the $V_{DD}$ power supply voltage is not supplied from the power supply circuit 6. In this case, however, the transistor TR2 is cut off, so that the transistor TR11 is rendered conductive, and therefore, the circuit is brought into the rapid charging mode. In other words, when the power supply is off, the circuit fails to shift to the safety side. (This is against the fail safe). Therefore, the transistor TR1 in the rapid charging switching circuit cannot be substituted simply by an NPN transistor.

Figure 7:
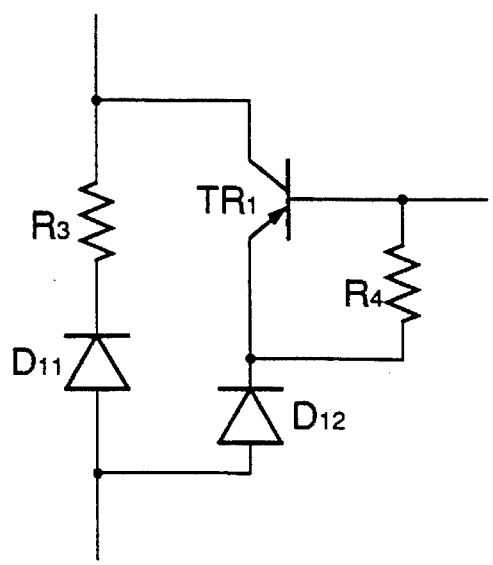
FIG. 7 is a block diagram of the case that a measure is taken to prevent the leakage current, showing one embodiment of the present invention.

Consequently, in order to prevent the current leakage generated in the rapid charging switching circuit 2 having the circuitry structure as shown in FIG. 2, a diode D12 must be connected in series to the transistor TR1 as shown in FIG. 7. In the embodiment shown in FIG. 1, therefore, these diodes D11 and D12 are combined as one diode connected in series to the rapid charging switching circuit 2.

Figure 8:
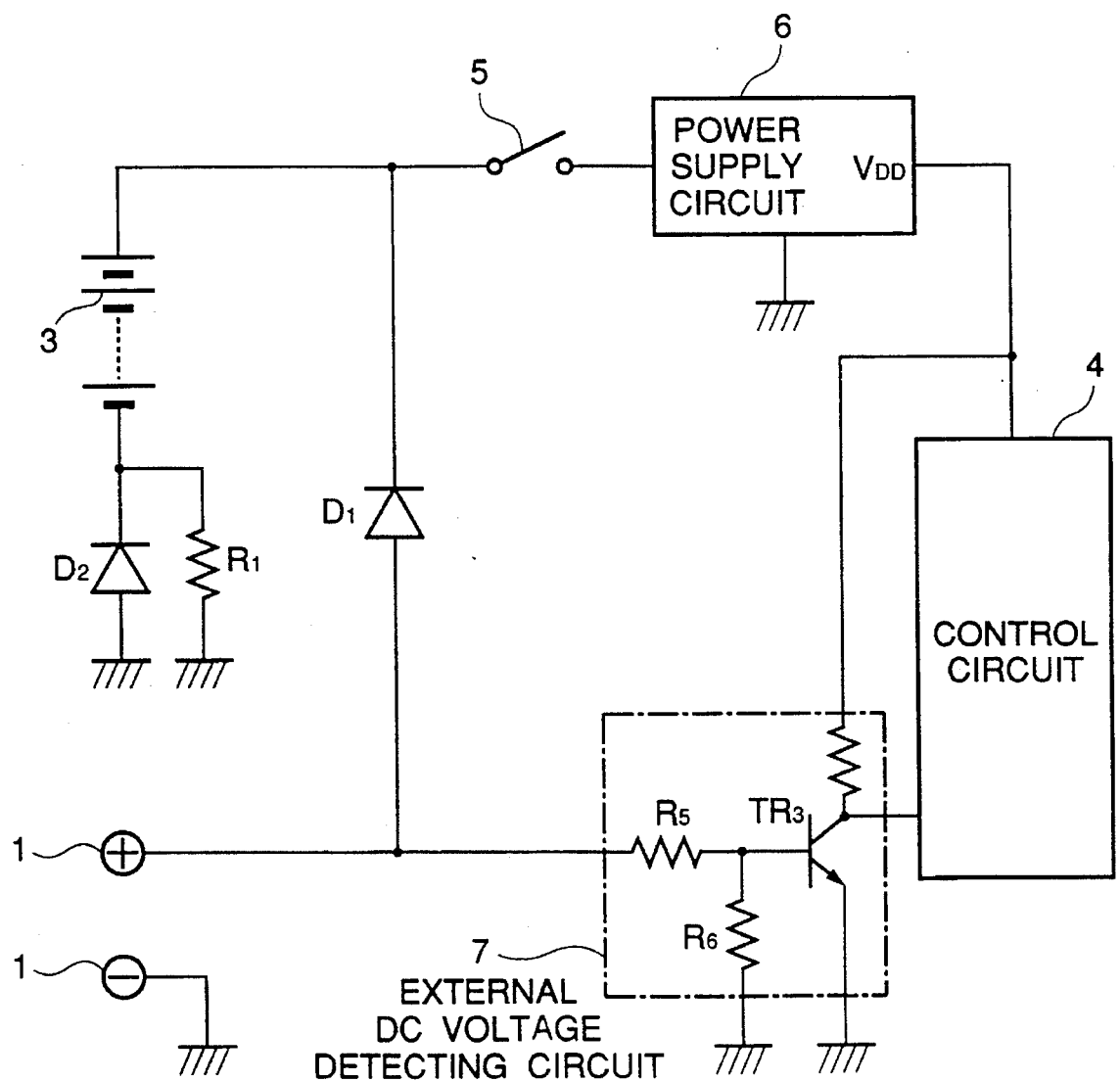
FIG. 8 is a block diagram of a charging circuit, showing another embodiment of the present invention.

FIG. 8 shows another embodiment of the present invention and is a block diagram of a charging circuit. The constituents having the same function as that of the first embodiment shown in FIG. 1 are given the same Reference Numerals and the explanation thereof will be omitted.

In the discharging circuit of the second embodiment, the rapid charging switching circuit 2 of the first embodiment shown in FIG. 1 is eliminated. Then, a charging resistor R3 having a resistance value corresponding to the sum of those of the first and second charging resistors R1 and R2 is connected to the negative electrode of the battery 3 in parallel with the discharging diode D2.

Accordingly, the charging circuit of the second embodiment does not effect the rapid charging, and performs only the usual charging. However, even if the battery 3 has a low voltage or is removed, the circuit has the same effect as that of the first embodiment, namely, it is possible to supply a sufficient amount of current from the external power supply terminals 1 and 1' to the power supply circuit 6 directly.

As will be apparent from the above description, the charging circuit in accordance with the present invention has an effect that the external power supply can directly supply the power supply voltage to the power supply circuit of the machine without going through the charging resistor of the secondary cell type battery.

The invention has thus been shown and described with reference to the specific embodiments. However, it should be noted that the present invention is in no way limited to the details of the illustrated structures but changes and modifications may be made within the scope of the appended claims.

We claim:

1. A charging circuit, comprising:
    a first power terminal to be supplied with an external DC power voltage;
    a second power terminal to be coupled to a secondary cell type battery;
    a reference terminal;
    an electric circuit coupled between said second power terminal and said reference terminal, and operating on a current supplied from said second power terminal;
    an external DC voltage detecting circuit having an input node connected to said first power terminal, and detecting that said external DC voltage is being supplied to said first power terminal when receiving a current at said input node, and that said external DC voltage is not being supplied to said first power terminal when receiving substantially no current at said input node;
    a first diode connected between said first and second power terminals to allow a current to flow from said first power terminal to said electric circuit through said second power terminal and to prevent a current flowing from said second power terminal to said input node of said external DC voltage detecting circuit through said first power terminal;
    a second resistor (R2) connected in series with said first diode between said first and second power terminals; and
    switch means connected in parallel with said second resistor, which, when activated, forms a low-impedance current path in parallel with said second resistor, thereby enabling said secondary cell type battery to be charged rapidly.

* * * * *

UNITED STATES PATENT AND TRADEMARK OFFICE
CERTIFICATE OF CORRECTION

PATENT NO.    :   5,523,669
DATED         :   June 4, 1996
INVENTOR(S)   :   Setsuya OKU, et al.

It is certified that error(s) appears in the above-identified patent and that said Letters Patent is hereby corrected as shown below:

Column 1, line 16, delete "operates with receiving an" and insert --receives--.

Column 4, line 37, delete "tile" and insert --the--.

Column 4, line 45, delete "resistor 5" and insert --resistor R1--.

Column 4, line 58, after "detecting" insert --terminals 1 and 1' by resistors R5 and R6, and supplies an external DC--.

Signed and Sealed this

Nineteenth Day of November, 1996

Attest:

BRUCE LEHMAN

Attesting Officer    Commissioner of Patents and Trademarks